United States Patent
Hawkins et al.

(10) Patent No.: US 11,034,097 B1
(45) Date of Patent: Jun. 15, 2021

(54) METHOD FOR BUTT FUSION OF POLYETHYLENE PIPE

(71) Applicant: McElroy Manufacturing, Inc., Tulsa, OK (US)

(72) Inventors: Amanda Hawkins, Bixby, OK (US); Arthur H. McElroy, II, Tulsa, OK (US); James S. Johnston, Jr., Coweta, OK (US); Dave Ray Hughes, Tulsa, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 36 days.

(21) Appl. No.: 16/545,888

(22) Filed: Aug. 20, 2019

(51) Int. Cl.
*B32B 41/00* (2006.01)
*B29C 65/00* (2006.01)
*F16L 13/08* (2006.01)
*B29C 65/20* (2006.01)

(52) U.S. Cl.
CPC .......... *B29C 66/9441* (2013.01); *B29C 65/20* (2013.01); *B29C 66/5221* (2013.01); *B29C 66/71* (2013.01); *F16L 13/08* (2013.01)

(58) Field of Classification Search
CPC . B29C 66/9441; B29C 66/5221; B29C 65/20; B29C 66/71; F16L 13/08

USPC ..................... 156/60, 64, 350, 351, 378, 379
See application file for complete search history.

(56) References Cited

U.S. PATENT DOCUMENTS

| | | | |
|---|---|---|---|
| 5,013,376 A * | 5/1991 | McElroy, II | B29C 65/7802 156/358 |
| 8,389,902 B2 | 3/2013 | McKinley | |

OTHER PUBLICATIONS

Lester H. Gabriel, History and Physical Chemistry of HDPE, Chapter 1, Handbook of Polyethylene Pipe, 2nd Ed. The Plastic Pipes Institute Book, 18 pages, published 2008.

(Continued)

*Primary Examiner* — Michael N Orlando
*Assistant Examiner* — Joshel Rivera
(74) *Attorney, Agent, or Firm* — Whitaker Chalk Swindle & Schwartz PLLC; Stephen Mosher

(57) ABSTRACT

A method for minimizing the time to form a polyethylene pipe e joint comprises the steps of performing a butt-fusion process until the beginning of the full cooling cycle; holding an interfacial pressure through a minimum cool time calculated using a formula based on the wall thickness of the pipe e, the initial bulk temperature of the pipe e, and a heat soak time; and releasing the interfacial pressure from the fused pipe e joint at the end of the calculated minimum cool time.

5 Claims, 3 Drawing Sheets

(56) References Cited

OTHER PUBLICATIONS

Standard Practice for Heat Fusion Joining of Polyethylene Pipe and Fittings, ASTM International, Article, 21 pages, Designation: F2620-11; © Dec. 15, 2011.

Dr. Chris O'Connor, Polyethylene Pipelines Systems—Avoiding the Pitfalls of Fusion Welding, Proceedings of the 2012 Pipeline Technology Conference, 26 pages, Mar. 28, 2012.

McElroy; How Do We Optimize the Butt Fusion Process Without Sacrificing Quality!, 26 pages, PowerPoint Presentation, presented Aug. 21, 2018, Dallas Texas.

Amanda Hawkins, Introducing a Faster HDPE Butt Fusion Weld Cycle Procedure Without Compromising Joint Strength, 26 pages, PowerPoint Presentation, presented Sep. 20, 2018 at Infusion 18, industry Conference.

Amanda Hawkins, et al., Increasing HDPE Butt Fusion Productivity by Optimizing the Cool Time Based on Thermal Mass Characteristics Without Compromising Joint Strength; Article, 12 pages, © 2018 by McElroy, Proceedings of the 19th Plastic Pipes Conference PPXIX, Sep. 24-26, 2018, Las Vegas, Nevada.

McElroy Webpages, Datalogger 6, 9 pages, www.mcelroy.com/en/fusion/datalogger.htm.

\* cited by examiner

METHOD FOR BUTT FUSION OF POLYETHYLENE PIPE

BACKGROUND OF THE INVENTION

1. Field of the Invention

The present invention concerns processes for joining polyethylene pipe e ends together and more particularly for shortening the overall time for performing a butt-fusion process to join the pipe e ends together.

2. Background of the Invention

Polyethylene (PE) pipe e is widely used for conveying water and chemicals and other substances in pipe eline systems because of its strength, durability, longevity, and ease of forming pipe e joints in situ. The industry standard procedures for performing forming heat-fused joints between the ends of polyethylene (PE) pipe e sections include ASTM F2620, ISO 21307, and DVS 2207-1. The most common standard used in North America is set forth in the ASTM F2620-13.

While these standards are efficient and reliable, they are also conservative, especially as to the time to be allowed for the fused joint to cool before it may be handled. One reason for this caution is that a variety of factors such as ambient temperature, bulk pipe e temperature, and the actual heat time have not been adequately studied to fully account for their effects during the butt fusion process. Without such study, the presence of many variables during the processes of forming the pipe e joints suggested that plenty of time be allowed for the newly formed joint to become fully cooled.

Unfortunately, the required time to allow for cooling the fused joints in the ASTM F2620 standard is based on a conservative rule of thumb to allow for the effects of these previously unaccounted for variables. For example, the ASTM F2620 standard specifically requires a cooling time of 11 minutes per inch of wall thickness of the PE pipe e. For the thick-walled pipe es typical of large pipe elines, this involves a considerable cooling time for each joint of a pipe eline. This cooling time is thus equivalent to a waiting time, in which the heat fusion apparatus is idle for an extended period after the heat fusion procedure is completed. This waiting time substantially affects the efficiency of pipe eline formation, along with the attendant costs. A need thus exists for a more efficient pipe e-joining process.

SUMMARY OF THE INVENTION

Accordingly, a method is disclosed for minimizing the time to form a pipe e joint between the ends of polyethylene pipe e (PE) to be joined in a butt-fusion process, comprising the steps of performing the butt-fusion process according to a standard procedure until the beginning of the cooling cycle; holding an interfacial pressure through a minimum cool time calculated using a a formula based on the wall thickness of the pipe e, the bulk temperature of the pipe e, and the heat soak time—the period of time the heat is applied to the ends of the pipe e to be joined; and releasing the interfacial pressure from the fused pipe e joint at the end of the calculated minimum cool time.

DETAILED DESCRIPTION OF THE INVENTION

Figure 1:
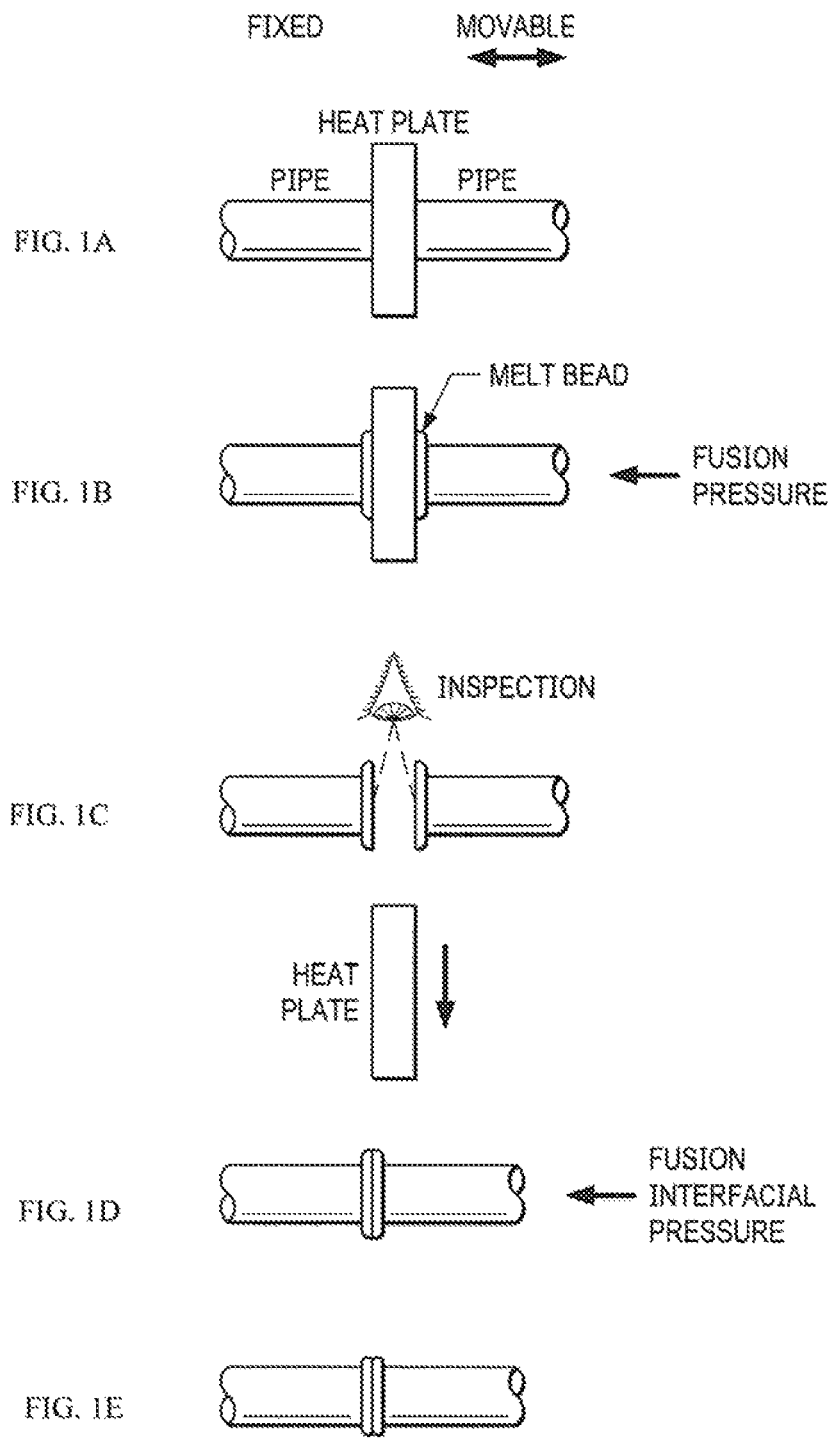
FIG. 1A illustrates a first process step for forming a butt-fusion joint in accordance with an embodiment of the claimed invention.
FIG. 1B illustrates a second process step for forming a butt-fusion joint in accordance with an embodiment of the invention.
FIG. 1C illustrates a third process step for forming a butt-fusion joint in accordance with an embodiment of the invention.
FIG. 1D illustrates a fourth process step for forming a butt-fusion joint in accordance with an embodiment of the invention.
FIG. 1E illustrates a fifth process step for forming a butt-fusion joint in accordance with the embodiment of the invention.

In an advance in the state of the art, a method is disclosed for reducing the required cooling time of a butt-fused joint formed between the abutting ends of polyethylene (PE) pipe e during a heat fusion process. The butt-fusion process forces the butt ends of PE pipe e together under a prescribed pressure after the ends have been faced smooth and clean, and heated so that the molten PE material bonds the pipe e ends together into a fused joint. The term for the prescribed pressure at the faces of the joint is "interfacial pressure." The term "interfacial pressure" is to be distinguished from the more commonly used term "fusion pressure," which refers to the pressure exerted by the hydraulic fusion machine. The "fusion pressure" depends on characteristics of the hydraulic cylinder in the machine and other operating factors such as drag—a load factor inherent in the machine.

Regarding the characteristics of polyethylene pipe e, at room temperatures, polyethylene ("PE") is a semi-crystalline material formed of multiple polyethylene monomers. The material includes regions of a moderate-to-high density of molecular chains and amorphous regions of relatively unorganized molecules. The distribution of these regions affects the density and strength of the polyethylene material, as well as its melting point. For example, the melting point of high density PE is 266'F. By comparison, the melting point of ordinary polyethylene is 230° F. As the polyethylene is heated, the organized structure breaks down, becoming amorphous as the material melts. As the material cools, the material transitions back to its original, semi-crystalline state. In one example, high density polyethylene (HDPE) is characterized by a higher proportion of crystalline regions in its structure than low or moderate density polyethylene, but its behavior with temperature is similar. The melting point of HDPE or PE is the temperature at which it becomes completely amorphous in its molten state.

The exemplary method to be disclosed herein as an illustration applies a calculation to certain specific parameters of polyethylene (PE) including (a) the wall thickness of the pipe e, (b) the bulk heat temperature of the pipe e, and (c) the heat soak time, all of which are variables in a formula. The formula is used during the process to determine the required cooling time before the pipe e sections joined at a butt-fused joint may be safely handled.

While the example is described for the case of high density PE pipe e, the method is equally applicable to PE pipe e of other densities. The result is a cool time value tcool (to be defined) to indicate when the interfacial pressure value at the joint can be released from the pipe e during the appropriate step in the butt-fusion process as employed in the field. The calculation enables a significantly shortened time tcool for cooling of the joint before the pipe e can be released from the fusion apparatus and safely handled. It turns out that this relatively short "cool time" tcool, which coincides approximately with the time when the butt-fused joint has regained sufficient strength a to be safely handled, is significantly shorter than the minimum cool times specified in the industry standard ASTM F2620. This result is counterintuitive and strongly suggests a substantially more efficient butt-fusion process that should save considerable time and cost of forming a PE pipe e joint using the butt-fusion process.

Figure 3:
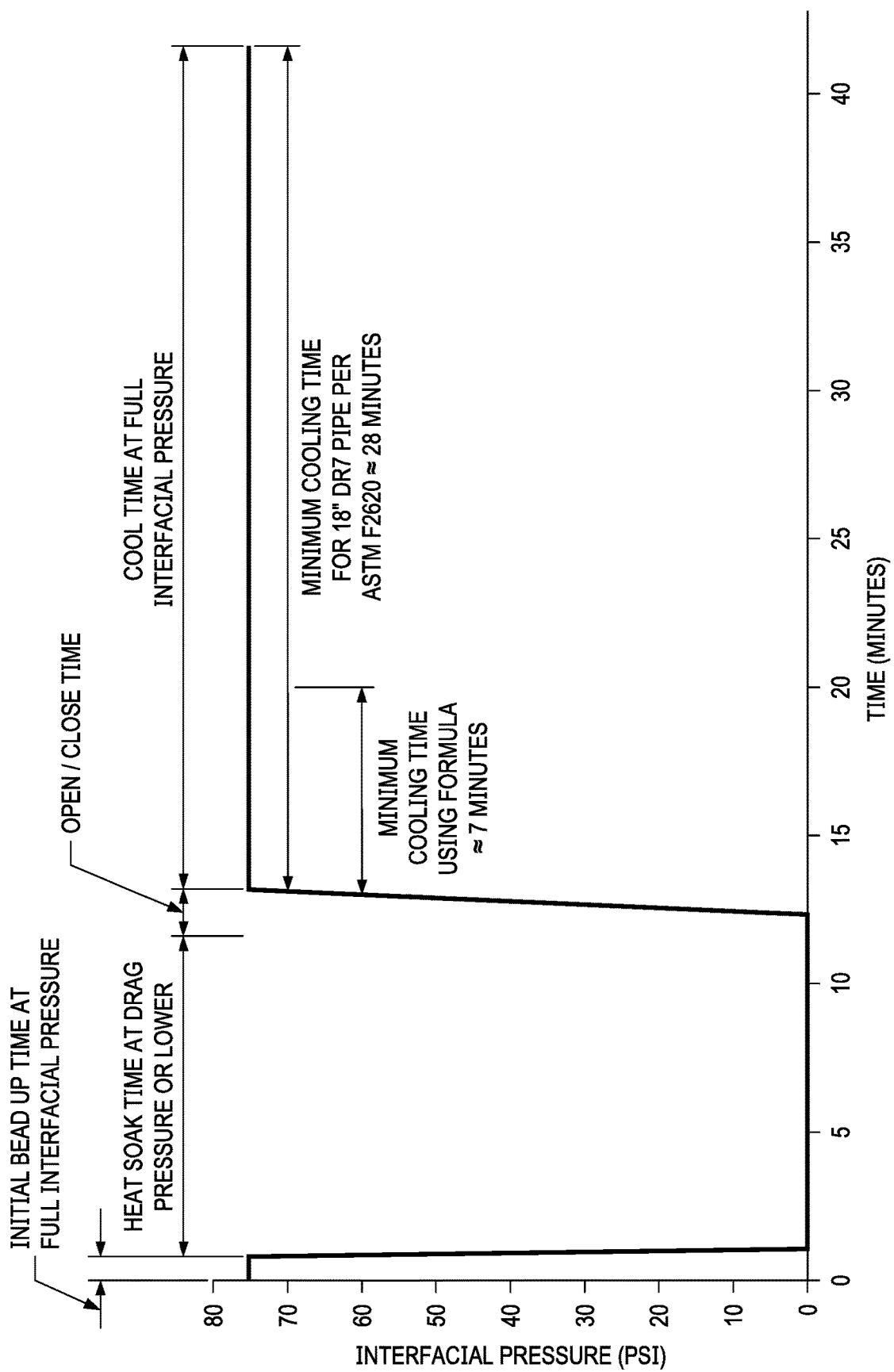
FIG. 3 illustrates a graph of interfacial pressure vs. time for a butt-fusion process to compare two different values of the minimum cooling time.

An important parameter in the process is the time for a butt-fused pipe e joint to cool. As will be described, the present invention concerns a method to shorten the cool time to improve the efficiency of the process. The cool time, tcool, is defined as the period after the heat source is removed from the joint and the joint begins to cool, as shown in FIG. 3. The minimum cooling time of eleven (11) minutes per inch of wall thickness as specified in the ASTM F2620 Standard is much longer than the cool time tcool described herein according to the present invention.

In the field, during assembly of the PE pipe e into a pipe eline, the parameters used to determine the cool time value are input to a butt-fusion machine by an operator as follows. The first parameter, (a) the wall thickness of the pipe e d, is calculated from its DR value. A pipe e is characterized by its dimension ratio or "DR," the ratio of its outside diameter (OD) to its wall thickness. Thus an 18 inch diameter pipe e with a dimension ratio of 7 (DR 7) would have a wall thickness d of approximately 2.5 inches. The second parameter, (b) the bulk pipe e temperature Tpipe e, may be determined from a pyrometer measurement of the pipe e temperature taken near the site of the joint under ambient conditions and takes into account whether the pipe e has or has not absorbed heat from the sun, for example. The third parameter, (c) the heat soak time tsoak, a time value measured by the operator, measures the amount of time in seconds for the required melt bead to form at each pipe e end at the joint from the time when melting is initially observed until the formed bead reaches a prescribed size, when the contact pressure between the abutted ends of the pipe e sections is reduced. These three parameters may be input as variables to a logging control device such as a DataLogger® (a product of McElroy Manufacturing, Tulsa, Okla.), which plugs these variables into a formula stored in a non-volatile memory of the logging control device. The formula is used by the data logging device to calculate the cool time tcool when the interfacial pressure may be released as will be described.

According to the "Standard Practice for Heat Fusion Joining of Polyethylene Pipe and Fittings," ASTM Standard F2620 the butt fusion process generally includes the following steps performed by an operator using a manual or hydraulic machine: (1) support the ends of the pipe e sections to be joined, one end in a fixed clamp on the machine, the other end in a movable clamp, initially separated from the fixed end by several inches and aligned on a common axis; (2) trim the facing ends of the pipe e sections in a facer device so that the ends to be joined are parallel and smooth, then clean the ends of the pipe e sections; (3) insert a flat heating plate heated to a temperature between 400° F. to 450° F. between the pipe e ends and bring the ends in contact with the heating plate under an interfacial pressure between 60 psi and 90 psi, typically 75° F.; (4) hold the interfacial pressure until the pipe e material begins to melt, then reduce the pressure to zero while maintaining the ends in contact for a prescribed minimum time, called the heat soak time, and a bead forms on the end of each pipe e and grows to a prescribed size for the particular pipe e size; (5) quickly remove the heating plate, inspect the ends of the pipe e and return the pipe e ends into contact; (6) apply the interfacial pressure and hold the molten joint for a prescribed cool time for the particular diameter and wall thickness of the pipe e; and (7) unclamp the jaws of the butt fusion machine from the pipe e to release the interfacial pressure and allow the joint to continue cooling and complete the fusion process. At this point the butt-fused joint has sufficient strength to allow normal handling, even as the pipe e will continue to cool to its full strength. The total length of the full cooling cycle, which begins with the calculated cool time, will in general be longer for thicker-walled pipe e and higher ambient temperatures.

During step (6) the molten polymer material in the PE joint begins to harden (re-crystallize) as it cools. Within a relatively short time—on the order of a minute or so—the joint has hardened sufficiently for the PE to begin regaining a substantial portion of its strength. The amount of time in the full cooling cycle for the joint to reach full strength typically occurs within approximately 30 minutes, a period that is primarily dependent upon the wall thickness of the pipe e, the bulk pipe e temperature, and to some degree, the ambient temperature. However, the term "substantial portion of its strength" refers to the sufficient strength (but not yet full strength) that allows safe handling the fused pipe e joint and its release from the heat fusion apparatus. The apparatus may be removed from the joined pipe e after the cool time period provided that rough handling such as lifting the joined pipe e at the fused joint, pulling the joined pipe e horizontally out of the machine without adequate support, or allowing the fused section to fall to the ground is avoided.

FIGS. 1A through 1E illustrate process steps for forming a butt-fusion joint between two sections of PE pipe e, in accordance with the described embodiment of the claimed invention. FIG. 1A depicts the ends of the pipe e section after they have been supported in the clamping fixtures of the fusion apparatus, the facing ends trimmed and cleaned to provide flat, uniform surfaces to be joined, and a heating plate heated to the prescribed temperature—typically between 400° F. and 450° F.—and the pipe e sections pressed against the heating plate with an applied interfacial pressure. These actions correspond to the first three steps of the ASTM F2620 standard process described above.

FIG. 1B illustrates holding the interfacial pressure until the ends of the pipe e sections begin to melt, then reducing the interfacial pressure and waiting until the correct bead size for the diameter and wall thickness of the pipe e is achieved. At that point, in FIG. 1C, the pipe e sections are separated, the heating plate withdrawn, and the heated ends of the pipe e sections quickly inspected for anomalies, before the next step, FIG. 1D, to bring together the heated ends under the interfacial pressure and holding the interfacial pressure for the prescribed cool time to form the fused joint. For example, this prescribed minimum cool time while the joint is being fused, is defined in the ASTM F2620 Standard as I1 minutes per inch of wall thickness for PE pipe e. After the prescribed minimum cool time, the pipe e clamps are withdrawn as in FIG. 1E, the pipe e is removed from the machine, and cooling of the joint allowed to continue to its full strength.

However, according to the present invention, the timing of the beginning of the step in FIG. 1E corresponds with the time at which the fused joint may be handled—that is, when the heat fusion apparatus may be removed to the next joint to be formed while the newly formed joint is properly supported to prevent application of bending or stretching forces to the fused joint as it completes the full cooling cycle.

The ASTM process per F2620 as depicted in FIGS. 1A through 1E for forming a butt-fused joint requires substantial time, especially for pipe e having a higher wall thickness. As described herein, the steps (3) and (4) involving heating typically take a fraction of a minute up to several minutes. The full cooling cycle of steps (6) and (7) taken together typically takes several times as long as the heating cycles. Step (7), after release of the interfacial pressure as in FIG. 1E, markedly affects the efficiency of the process, particularly for heavier wall PE pipe es. Various ways to improve efficiency by accelerating the cooling process have been tried but have not provided a practical method or even a useful result. For example, circulating ice water through the joint when compared with the standard according to ASTM F2620 showed little difference in the rate of cooling the joint measured in the middle of the pipe e wall at the joint location. This result is consistent with the fact that polyethylene is a good insulator, which impedes rapid cooling. A research project was undertaken by the Applicants to find a way to shorten the full cooling cycle that focused on identifying the parameters of the pipe e characteristics and the butt-fusion process that affect the cooling process.

This research project included extensive testing of representative PE pipe e samples in controlled environmental conditions while performing the butt-fusion process according to the ASTM F2620 standard. The tests revealed that, for heavy-walled PE pipe e, a butt-fused joint is not dramatically affected by changes in the conditions of testing, although it did show that wall thickness, bulk pipe e temperature (and also ambient temperature) do affect the cooling rate over the full cooling cycle. It should be understood that the bulk pipe e temperature may be different than the ambient temperature due to "sun load," the effect of sun shine on the pipe e material, or the latent effects of other factors that may cause changes in the bulk temperature of the pipe e. However, the research also revealed a surprising result: the strength of a butt-fused joint becomes sufficiently strong to permit handling the pipe e by terminating the minimum cool time much sooner after the heat plate (step 5 of the ASTM F2620 process) is removed and the interfacial pressure is restored. The minimum cool time=tcool, which governs the time to release the interfacial pressure as predicted by the formula, occurs in a transition region near the core joint temperature where the polymer material of the PB pipe e enters the re-crystallization portion of the full cooling cycle; i.e., when it has begun to harden.

Figure 2:
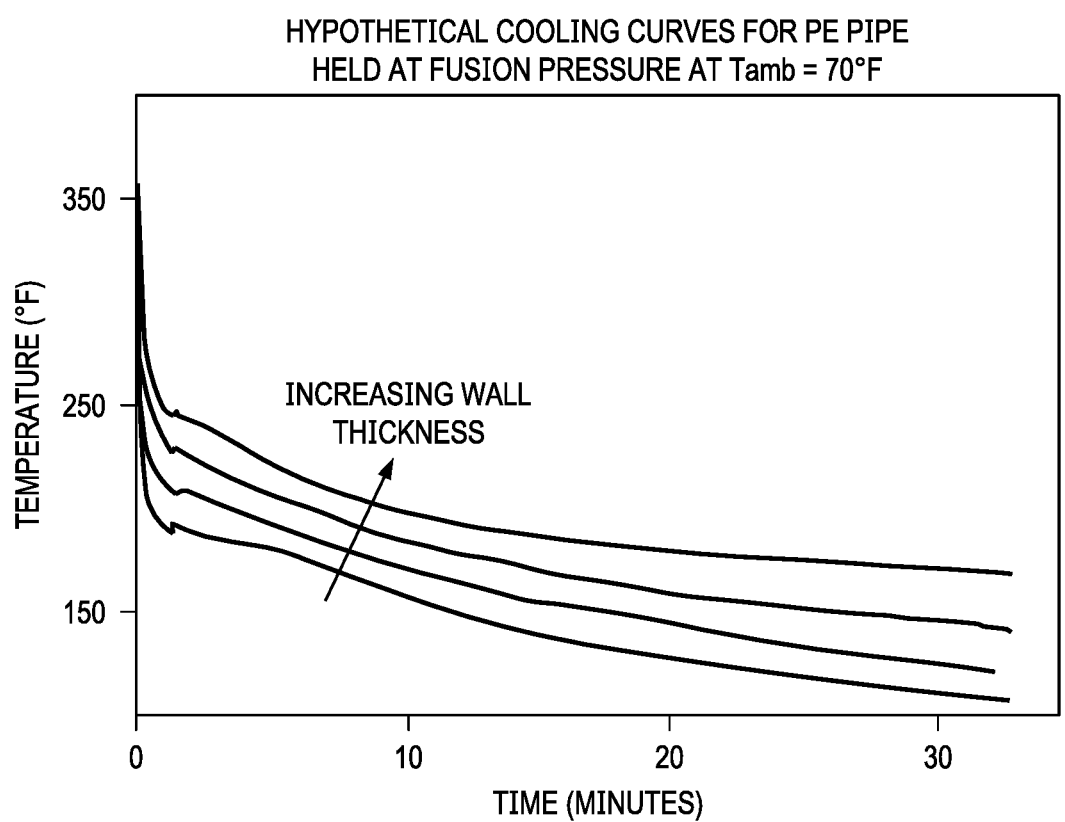
FIG. 2 depicts a hypothetical family of curves of temperature vs. time of the core temperature of the pipe e joint during the formation of a butt-fused joint, in accordance with an embodiment of the claimed invention.

Re-crystallization of the polymer material occurs during the transition region as the material cools from its molten state to its solid state. Following the removal of the heat plate, the core temperature drops rapidly—about 200° F. from the temperature of fusion (400° F. to 450° F.) until the polymer material begins to re-crystallize, as shown in FIG. 2. Then the rate of cooling slows substantially during the transition period, which may be at a rate of approximately 3 to 5 degrees Fahrenheit per minute as the material becomes solid, taking on the characteristics of an insulator. Cooling of the solidified polymer material through the full cooling cycle is influenced by the bulk pipe e temperature, the wall thickness of the pipe e, and to some degree, the ambient temperature. During testing, for example, the cooling time at 70° F. is approximately twice that at 40° F. This particular result occurred when no sun load was present, so the bulk pipe e and ambient temperatures were the same in both cases. Similarly, cooling the fused joint to an ambient temperature near 100° F. may take from 20 to 40 minutes or longer, depending on the wall thickness of the pipe e. FIG. 2 depicts a hypothetical family of curves for different pipe e wall thicknesses, plotting the core joint temperature vs. time during the formation of a butt-fused joint.

The curves of FIG. 2 illustrate the rapid cooling during an initial period when re-crystallization begins to occur—where the structure of the material begins to make the transition from an amorphous molten state into the solidified crystalline state. This transition varies with wall thickness, type of PE pipe e, and other factors, but tends to occur at a temperature in the range of 180° F. to 250° F. The curves shown in FIG. 2 were plotted form data taken at an ambient temperature of 70° F. This rapid cooling—the period of the minimum cool time tcool that is calculated using the formula previously described—occurs during the initial portion of the full cooling cycle.

Continuing with FIG. 2, after the molten material at the joint begins to harden during the re-crystallization period—at the minimum cooling time tcool—the fused joint is becoming strong enough to permit safe handling of the joint during removal of the butt-fusion apparatus. For instance, the strength of the fused joint at this point has become approximately 50% or more of that of a fully cooled butt-fused joint. This finding suggests that the minimum cooling time a butt-fused joint can be safely handled can be substantially shortened from the 11 minutes per inch of wall thickness, if a way can be found to determine the value of tcool, i.e., to know when the core temperature of a butt-fused joint has fallen sufficiently for the pipe e joint to become strong enough to safely handle the joined pipe e.

Further research into identifying the relevant factors—the measureable parameters that influence the cool time tcool of polyethylene pipe e during a butt-fusion process—found several parameters effective in predicting when a shortened cooling time may be employed without materially affecting the strength of the butt-fused pipe e joint as revealed by tensile impact tests performed according to ASTM Standard F2634. These factors—parameters involved in the ASTM F2620 standard butt-fusion procedures—are (a) the wall thickness of the pipe e, (b) the bulk pipe e temperature, and (c) the heat soak time. These parameters, known to or measured by the operator of the butt-fusion machine, may be input to a formula that calculates tcool for a butt-fused PE pipe e joint. The formula, which may be stored in a nonvolatile memory location in the memory of a data logging device or controller that an operator may use to control the fusion machine apparatus, thus provides an indicator when the fused pipe e joint may be released from the machine so that the machine can be moved to the next joint. According to the results of the research investigation described herein above, the minimum cool time tcool is substantially shorter than the minimum cool time—11 minutes per inch of wall thickness—specified in the ASTM F2620 Standard. This unexpected result is graphically illustrated in FIG. 3 to be described.

Regarding the operation of the machine, the wall thickness of the pipe e (a), as noted above, is determined from the DR, the dimension ratio of the pipe e. For example, an 18 inch diameter pipe e having a DR of 7 has a wall thickness of 2.5 inches, which is parameter (a). Similarly, an 18 inch diameter pipe e having a DR of 32.5 has a wall thickness of 0.55 inches for parameter (a). The bulk pipe e temperature (b) is the surface temperature of the pipe e in degrees Fahrenheit of the pipe e at the joint location before it undergoes the fusion process—i.e., the initial condition of the pipe e material—which may be measured using a resistance pyrometer or a thermocouple pyrometer before the fusion process begins. The heat soak time (c) is determined by the difference between the timing of two parts of the butt-fusion procedure. The beat soak time "tsoak" ends at the time t2 that the melt bead size (and the minimum time) are observed to be correct for the particular pipe e size (DR value) being joined. This time occurs at the end of step (4). The heat soak time tsoak begins at the time t1 that the pipe e material begins to melt, at the beginning of step (4). Thus, t2−t1=tsoak measured in seconds. These three parameter variables are each multiplied by a proportionality factor in the formula and summed with a base factor to determine the predicted minimum cooling time tcool.

FIG. 3 illustrates a graph of interfacial pressure vs. time for a butt-fusion process. The graphed plot is divided into four segments, A, B, C, and D, which are defined as follows: (A) defines the initial bead up time at full interfacial pressure, from the time the ends of the pipe e sections are pressed against the heat plate, which is heated to a temperature of 400° F. to 450° F. (B) defines the heat soak time at zero interfacial pressure, when the heat plate remains in contact with the faces of the pipe e ends but with near-zero pressure against them. (C) defines the brief open/close time of the sequence during which the clamps holding the pipe e sections are removed, the heat plate is removed, and the heated faces of the pipe e ends are quickly inspected. (D) defines the cool time at full interfacial pressure when the heated pipe e ends are forced together again under full interfacial pressure and the joint is allowed to cool.

Also shown on the graph of FIG. 3 are two values for the minimum cooling time of segment (D). One is for the minimum cooling time for 18 inch DR7 HDPE pipe e (DR7 means the wall thickness is 2.5 inches) as specified in ASTM F2620, which is about 28 minutes, as calculated by 11 minutes×2.5 inches. The other minimum cooling time for the same pipe e as determined using the formula yields a minimum cooling time of about 7 minutes, which is the much shorter period of minimum cooling time (but long enough according to the results of the research) that the fused pipe e sections may be safely removed from the machine. This the unexpected result of the research investigation by the Applicants who sought a method for reducing the minimum cooling time—the longest period in the butt-fusion process sequence—as a way to improve the efficiency of the butt-fusion process.

Accordingly, the inventive method may be stated as follows: A method for minimizing the time to form a pipe e joint between the facing ends of polyethylene (PE) pipe e sections, comprising the steps of (a) performing a butt-fusion procedure according to the ASTM F2620 Standard until the beginning of the cooling cycle; (b) holding the full interfacial pressure through a minimum cool time tcool calculated using a predictive formula based on the wall thickness of the pipe e, the initial bulk temperature of the pipe e, and the period of time tsoak that the heat is applied to the ends of the pipe e to be joined; and (c) releasing the fusion interfacial pressure from the fused pipe e joint a at the end of the minimum cool time as determined using the formula.

While the invention has been illustrated in only one of its forms, to depict and describe the concepts embodied in the invention, it is not thus limited but is susceptible to various changes and modifications without departing from the spirit of the invention. For example, the illustrated embodiment of the invention describes the method using high density polyethylene pipe e as one example, the method is applicable to joining polyethylene (PE) pipe e characterized by other density levels. The method is also applicable to many sizes and DR ratings of PE pipe e having different wall thicknesses.

What is claimed is:

1. A method for minimizing the time to form a pipe e joint between the ends of sections of polyethylene pipe e (PE) to be joined, comprising the steps of:
   performing a butt-fusion process according to a standard procedure until the beginning of the cooling cycle;
   holding the fused pipe e joint under an interfacial pressure through a minimum cool time calculated using a formula based on the parameters (a) the wall thickness of the pipe e, (b) the initial bulk temperature of the pipe e, and (c) the heat soak time the heat is applied to the ends of the pipe e sections to be joined; and
   releasing the fusion interfacial pressure from the fused pipe e joint at the end of the minimum cool time as calculated using the formula.

2. The method of claim 1, wherein the step of performing a butt-fusion process comprises the steps of:
   moving prepared first and second ends of the pipe e sections to be joined into a facing position and securing them with first and second clamps in a heat fusion apparatus;
   preparing the ends of the pipe e in a facing step;
   moving a heating plate into position between the first and second ends of the pipe e sections and pressing the first and second ends of the pipe e sections against the heating plate under an interfacial pressure;
   maintaining the interfacial pressure against the first and second ends of the pipe e sections until melting of the first and second ends begins;
   removing the heating plate when a predetermined bead size is formed and inspecting the heated first and second ends of the pipe sections; and
   returning the first and second ends of the pipe sections into contact under the interfacial pressure for the prescribed minimum cool time.

3. The method of claim 1, wherein the step of holding comprises the steps of:
   entering the parameters (a) the wall thickness of the pipe e, (b) the initial bulk temperature of the pipe e, and (c) the heat soak time the heat is applied to the first and second ends of the pipe e sections to be joined into a data logging control device; and
   using the formula to determine from the parameters (a), (b), and (c) the onset of re-crystallization of the polymer material of the PE pipe e as defined by the duration of the minimum cool time.

4. The method of claim 3, wherein the formula comprises the steps of:
   summing the parameter values (a), (b), and (c) with predetermined respective constants of proportionality;
   adding a base constant to the summed value; and
   calculating a value of the minimum cool time.

5. The method of claim 1, wherein the step of releasing comprises the step of:
   relaxing the fusion pressure to zero; and
   unclamping the jaws of the fusion apparatus.

* * * * *

UNITED STATES PATENT AND TRADEMARK OFFICE
CERTIFICATE OF CORRECTION

| | | |
|---|---|---|
| PATENT NO. | : 11,034,097 B1 | Page 1 of 1 |
| APPLICATION NO. | : 16/545888 | |
| DATED | : June 15, 2021 | |
| INVENTOR(S) | : Amanda Hawkins et al. | |

It is certified that error appears in the above-identified patent and that said Letters Patent is hereby corrected as shown below:

On the Title Page

In the Abstract, in Lines 2, 6 (twice), and 8, remove the extra letter 'e' after the word 'pipe'.

In the Specification

Columns 1 – 8, remove the extra letter 'e' after the word 'pipe', all occurrences.

In the Claims

Claim 1 at Lines 1, 2, 6, 9, 10, 11, and 13, remove the extra letter 'e' after the word 'pipe'.
Claim 2 at Lines 3, 7, 9, 10, and 13, remove the extra letter 'e' after the word 'pipe'.
Claim 3 at Lines 4 (twice), 6, and 10, remove the extra letter 'e' after the word 'pipe'.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*